United States Patent [19]

Yamazaki

[11] Patent Number: 4,976,602
[45] Date of Patent: Dec. 11, 1990

[54] MOTOR-OPERATED DIE CLAMPING MECHANISM OF AN INJECTION-MOLDING MACHINE

[75] Inventor: Seiji Yamazaki, Hachioji, Japan

[73] Assignee: Fanuc Limited, Yamanashi, Japan

[21] Appl. No.: 254,659

[22] PCT Filed: Feb. 19, 1988

[86] PCT No.: PCT/JP88/00180
§ 371 Date: Sep. 21, 1988
§ 102(e) Date: Sep. 21, 1988

[87] PCT Pub. No.: WO88/06963
PCT Pub. Date: Sep. 22, 1988

[30] Foreign Application Priority Data
Mar. 13, 1987 [JP] Japan ................. 62-56884

[51] Int. Cl.⁵ ............................................ B29C 45/66
[52] U.S. Cl. ................................. 425/188; 425/190;
425/450.1; 425/450.9; 425/589; 425/595;
425/DIG. 5; 425/DIG. 129; 425/DIG. 221;
425/451.9
[58] Field of Search ............... 425/183, 185, 188, 190,
425/191, 195, 405.1, 451.4, 451.5, 451.7, 415.9,
589, DIG. 5, DIG. 29, DIG. 221; 29/700

[56] References Cited

U.S. PATENT DOCUMENTS

| | | | |
|---|---|---|---|
| 4,645,447 | 2/1987 | Sumitomo | 425/450.1 |
| 4,698,007 | 10/1987 | Hehl | 425/190 |
| 4,810,182 | 3/1989 | Groll | 425/595 |

FOREIGN PATENT DOCUMENTS

| | | | |
|---|---|---|---|
| 23094 | 7/1985 | Japan | . |
| 125619 | 7/1985 | Japan | 425/589 |
| 27706 | 8/1986 | Japan | . |

*Primary Examiner*—Timothy Heitbrink
*Attorney, Agent, or Firm*—Staas & Halsey

[57] ABSTRACT

A motor-operated die clamp mechanism produces a great clamping force even with use of small-output motors, and is adapted for use in a motor-operated injection-molding machine. Screw portion (13a, 13b), threaded reversely to each other, are formed on a ball screw (13) which is rotated by a motor (15). Ball nuts (11, 12), which are threadedly engaged with the screw portions (13a, 13b), respectively, and a movable wedge (6) are coupled to one another links (9, 10). As the motor rotates, the links contract or spread, thereby advancing or retreating the movable wedge with a great force. When the movable wedge advances, it is engagedly pressed against a fixed wedge (5) formed on the mold base (4) of a die (3), thereby causing the die to be fixedly mounted on a stationary board (1) or a movable board (2).

7 Claims, 4 Drawing Sheets

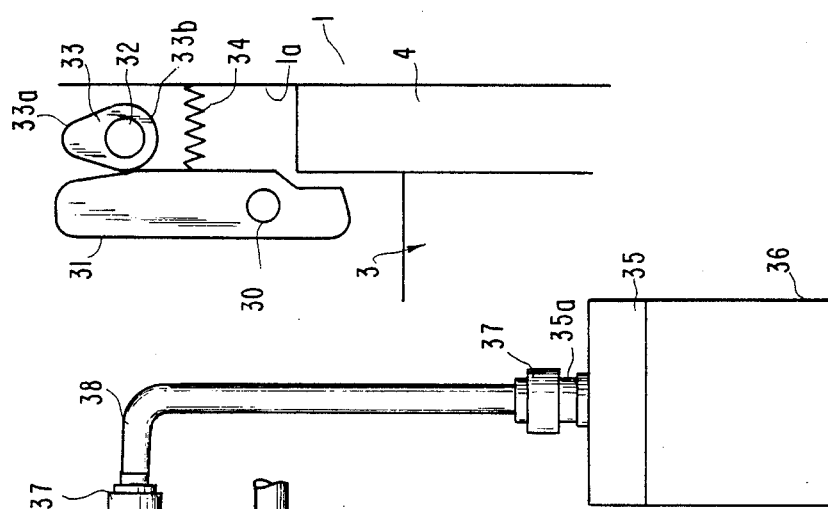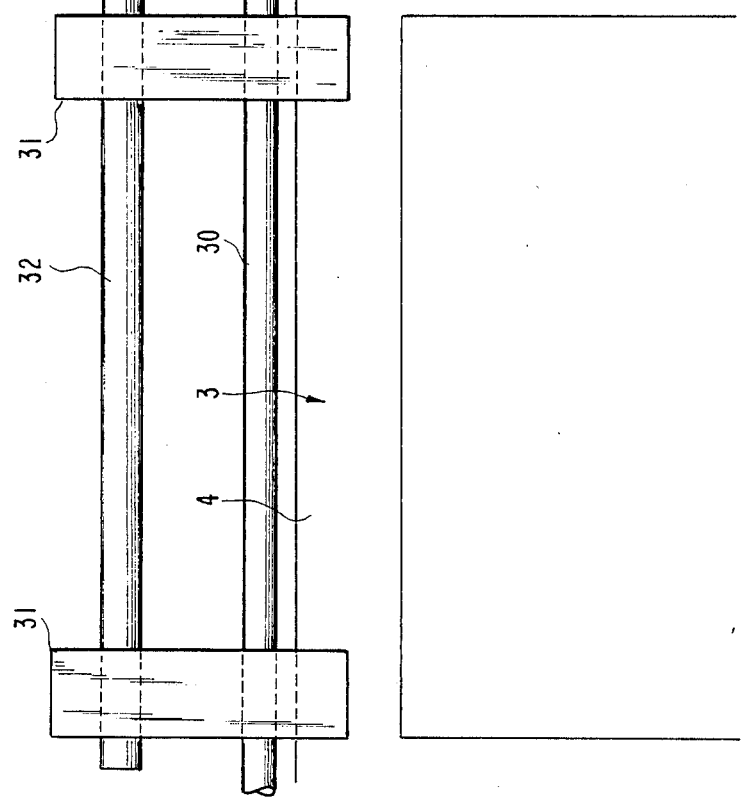

MOTOR-OPERATED DIE CLAMPING MECHANISM OF AN INJECTION-MOLDING MACHINE

BACKGROUND OF THE INVENTION

1. Field of the Invention

The present invention relates to a die clamp mechanism for removably mounting dies on a stationary board and a movable board of an injection-molding machine, and more particularly, to a motor-operated die clamp mechanism capable of producing a great clamping force even with use of small-output motors.

2. Description of the Related Art

In an injection-molding machine, dies are mounted on a stationary board and a movable board by the so-called "direct fastening" or "click fastening." In the former case, each die is fastened to its corresponding board, stationary or movable, by screwing mounting bolts into tapped holes which are formed in the stationary or movable board so as to be in alignment with mounting holes of the die. In the latter case, on the other hand, clamp plates, which are attached individually to the stationary and movable boards for movement, are driven toward the dies by manual operation or by means of a hydraulic mechanism, and a mold base of each die and clicks of its corresponding clamp plate are pressed against one another for engagement, thereby fastening the dies to the stationary and movable boards.

In the case of a motor-operated die injection-molding machine in which a mold clamp mechanism, injection mechanism, etc. are driven by means of motors, however, a die clamp mechanism should preferably be driven also by means of motors. Thus, when hydraulically driving a die clamp mechanism of a click-fastening type in a conventional manner, a hydraulic mechanism must be provided only for die mounting, resulting in poor economy.

SUMMARY OF THE INVENTION

An object of the present invention is to provide a motor-operated die clamp mechanism of an injection-molding machine capable of producing a great clamping force even with use of motors having low output torque, without using a hydraulic mechanism to mount dies on a stationary board and a movable board of an injection-molding machine.

In order to achieve the above object, a motor-operated die clamp mechanism according to the present invention comprises: a plurality of pressure means disposed individually on a stationary board and a movable board of the injection-molding machine so as to be movable toward and away from a die corresponding thereto and capable of pressing the corresponding die; a plurality of motor means corresponding to the plurality of pressure means; and a plurality of transmission means for amplifying the rotatory force of each corresponding one of the plurality of motor means and transmitting the amplified rotatory force to each corresponding one of the plurality of pressure means.

According to the present invention, as described above, the die clamp mechanism is driven by means of motors, so that a hydraulic mechanism need not be used for the clamp mechanism. Thus, there may be provided a clamp mechanism which is particularly adapted for a motor-operated injection-molding machine and is low-priced. Since the rotatory force of the motors is amplified by means of the transmission means, moreover, small-output motors can be used, thus permitting a low-priced clamp mechanism to be obtained.

BRIEF DESCRIPTION OF THE DRAWINGS

FIG. 4 is a partial view showing the principal part of a die clamp mechanism according to a third embodiment of the present invention; and FIG. 5 is a partial side view showing the principal part of the clamp mechanism of FIG. 4.

DETAILED DESCRIPTION OF THE PREFERRED EMBODIMENT

Figure 1:
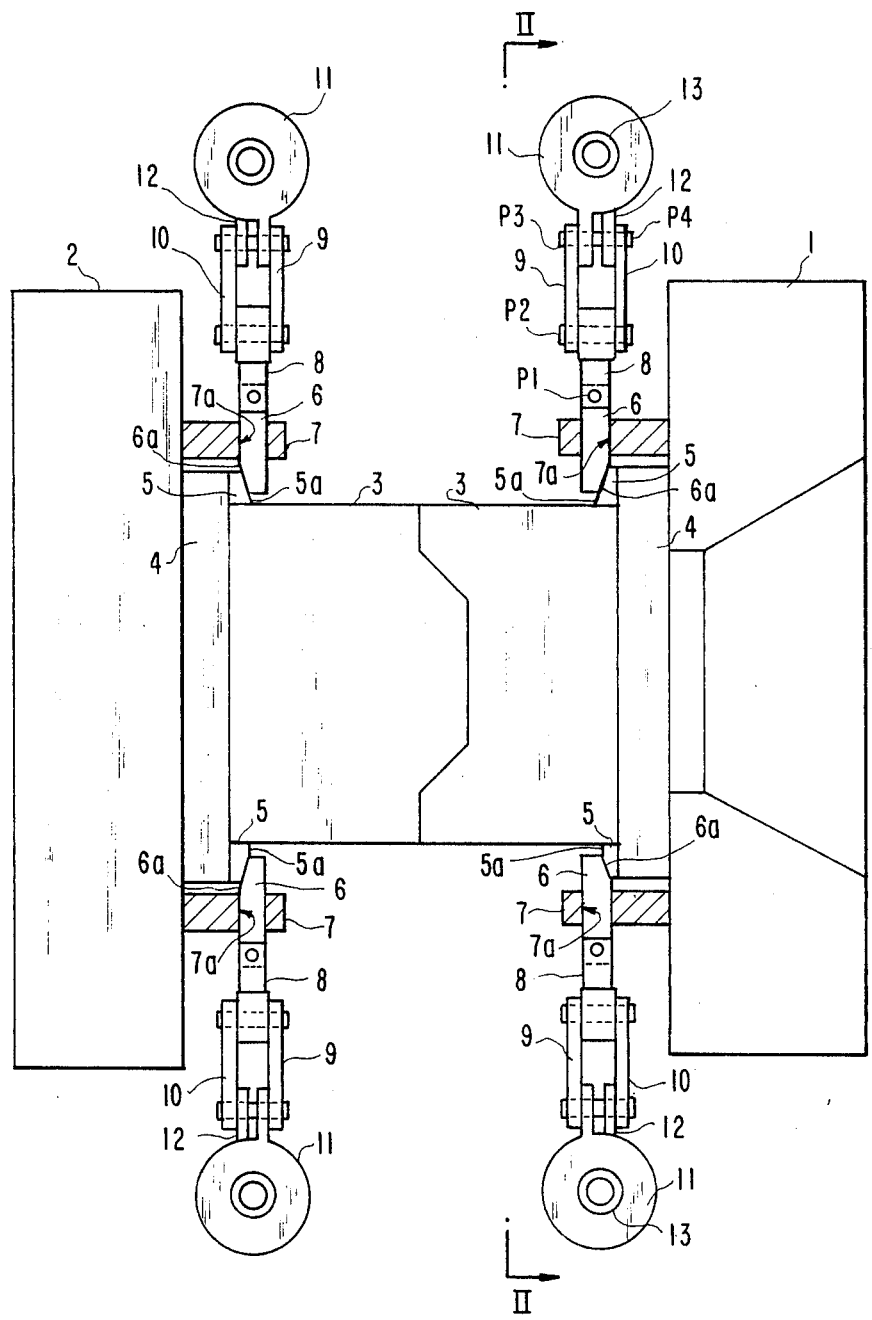
FIG. 1 is a front view showing a motor-operated die clamp mechanism according to a first embodiment of the present invention.
Figure 2:
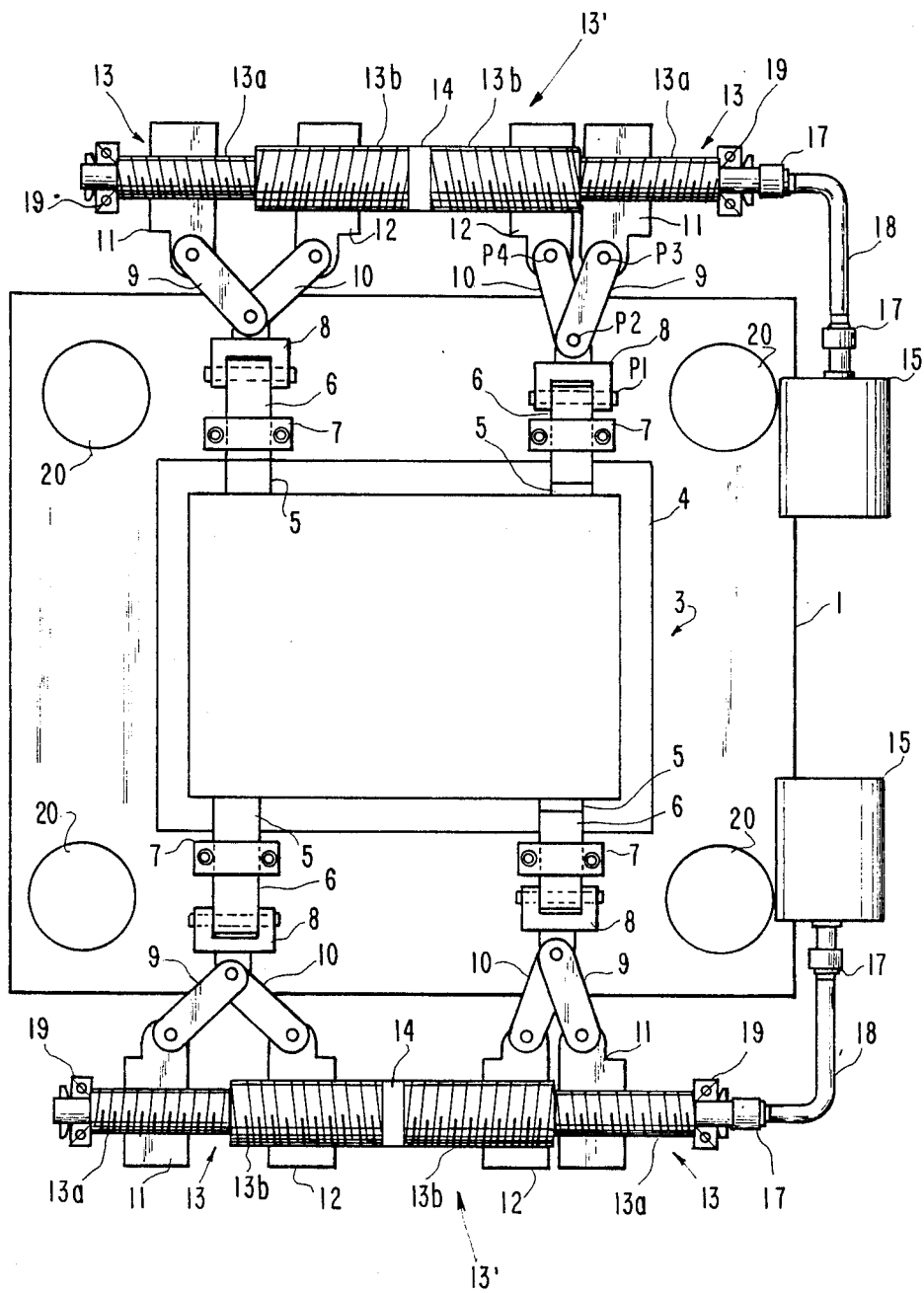
FIG. 2 is a schematic view taken along line II—II of FIG. 1.

In FIGS. 1 and 2, a motor-operated die clamp mechanism according to a first embodiment of the present invention is preferably provided in a motor-operated injection-molding machine (not shown in detail) of a type which drives various operating mechanisms, such as a mold clamp mechanism, injection mechanism, etc., by means of motors.

In the injection-molding machine, a movable board 2 is driven so as to approach and leave a stationary board 1 by means of the mold clamp mechanism, and dies 3 can be removably mounted on the stationary and movable boards 1 and 2. Fixed wedges 5 are fixed individually to the respective opposite end portions of the upper and lower edges of a mold base 4 of each die 3. Thus, in the present embodiment, four fixed wedges 5 are provided for each die 3. Each fixed wedge 5 is formed so that its thickness is reduced toward the outer edge of the mold base 4, that is, an end face 5a of each fixed wedge 5 remote from the mold-base side forms a slanting surface.

The die clamp mechanism with the aforementioned construction for mounting the dies 3 on the stationary and movable boards is composed of first and second clamp mechanism sections which correspond to the elements 1 and 2, respectively. Each of these clamp mechanism sections includes clamp portions, four in number or as many as the fixed wedges 5 attached to its corresponding die 3.

Each clamp portion includes a movable wedge 6 which, opposed to its corresponding fixed wedge 5, constitutes pressure means in conjunction with the wedge 5. The wedge 6 is reduced in thickness toward its distal end, and its end face 6a on the mold-base side forms a slanting surface. Moreover, the wedge 6 is disposed to be rectilinearly movable toward and away from the die 3, within a hole 7a in its corresponding wedge retainer 7, which is disposed in alignment with the fixed wedge 5 and fixed to the stationary or movable board 1 or 2, as a transmission mechanism, which, composed of elements 8 to 13 and P1 to P4, serves to amplify the rotatory force of a motor (mentioned later), operates. More specifically, the movable wedge 6 is rockably supported on one end of a coupling member 8 of the transmission mechanism by means of a pin P1. Links 9 and 10 are rockably supported, at one end thereof, on the other end of the member 8 by means of the pin P2. The other ends of the links 9 and 10 are rockably coupled to ball nuts 11 and 12 by means of pins P3 and P4, respectively. The ball nuts 11 and 12 are threadedly engaged with a small-diameter screw portion 13a and a large-diameter screw portion 13b, respectively, of a ball screw 13 which, in conjunction with the nuts, constitutes means for converting the motor rotation into a rectilinear motion of the movable wedge. Both the screw portions 13a and 13b are formed with threads such that their threading directions are opposite to each other.

As described above, the clamp portions with the aforementioned construction are arranged individually opposite to the four corners of the mold base 4 of each of the dies 3 on the stationary- and movable-board sides. The adjacent ball screws 13 at the upper or lower edge of the stationary or movable board 1 or 2 are formed integrally with each other through the medium of a junction 14, thus forming a screw body 13'. More specifically, at the junction 14 of the screw body 13', a projection formed on one of the respective opposite faces of the ball screws 13 which forms the screw body 13' is fitted in a recess formed on the other (not shown). Further, both ends of the screw body 13' are rotatably supported on its corresponding board, out of the stationary and movable boards 1 and 2, by means of bearings 19, and also, one end of the screw body 13' is operatively connected to a motor 15 with brake gear by means of a coupling 17 and a flexible joint 18. Thus, two motors 15 are provided for each of the stationary and movable boards 1 and 2. In FIG. 2, numeral 20 designates a tie rod. The movable board 2 is movable along the tie rod 20.

Additionally, FIG. 2 shows a state in which the clamp portions on the left and right half portions are in different operating positions, to meet the convenience of the following description (same for the case of FIG. 3, mentioned later). Actually, however, the clamp mechanism is constructed so that the two clamp portions associated with one screw body 13' always take the same operating position.

The following is a description of the operation of the motor-operated die clamp mechanism with the aforementioned construction.

Let it be supposed that all the clamp portions of the clamp mechanism take an operating position (shown in the left half portion of FIG. 2) such that the movable wedges 6 are retreated. First, the dies 3 on the stationary- and movable-board sides, in contact with each other, are arranged between the stationary and movable boards 1 and 2 which are spaced at a predetermined distance from each other. Then, all the motors 15 are driven in synchronism with each other, in a predetermined rotating direction. Since the small- and large-diameter screw portions 13a and 13b of each ball screw 13 are threaded reversely to each other, the ball nuts 11 and 12, threadedly engaged, respectively, with the screw portions 13a and 13b, which rotate accompanying the motor rotation, move so as to approach each other along the screw portions. As a result, the links 9 and 10 are gradually closed in a contracted manner, so that each movable wedge 6, which is coupled to both the links by means of the coupling member 8, slides inside the hole in the wedge retainer 7, thus advancing toward the die 3. In doing this, the movable wedge 6 is driven by means of a great force of e.g. about 10 to 20 tons, which is obtained by amplifying the motor's rotatory force by means of the transmission mechanism, which is composed of the links 9 and 10, ball nuts 11 and 12, and ball screws 13. As the movable wedge 6 advances, the slanting surface 6a of the wedge 6 slides on the slanting surface 5a of the fixed wedge 5, thereby gradually pressing the slanting surface 5a. Thereafter, when the movable wedge 6 reaches its forefront position shown in the right half portions of FIGS. 1 and 2, it engages the fixed wedge 5 with a great force of pressure. Thus, the dies 3 are securely fixedly mounted on the stationary and movable boards 1 and 2, individually, by the wedge effect. Subsequently, brake gears (not shown) attached to the motors 15 are worked to lock the output shafts of the motors and the ball screws 13 so that these elements cannot rotate, thereby maintaining this mounting state.

In removing the dies 3, on the other hand, the clamp mechanism is operated in the manner reverse to the steps of procedure for the die mounting. More specifically, after the brake gears are disengaged, all the motors 15 are reversed. As the motors reversely rotate in this manner, the ball nuts 11 and 12 move away from one another along the screw portions 13, thereby spreading the links 9 and 10. Thereupon, the movable wedges 6 move away from the dies to be disengaged from the fixed wedges 5, as shown in the left half portion of FIG. 2, so that the dies 3 are allowed to be removed from the stationary and movable boards 1 and 2.

Figure 3:
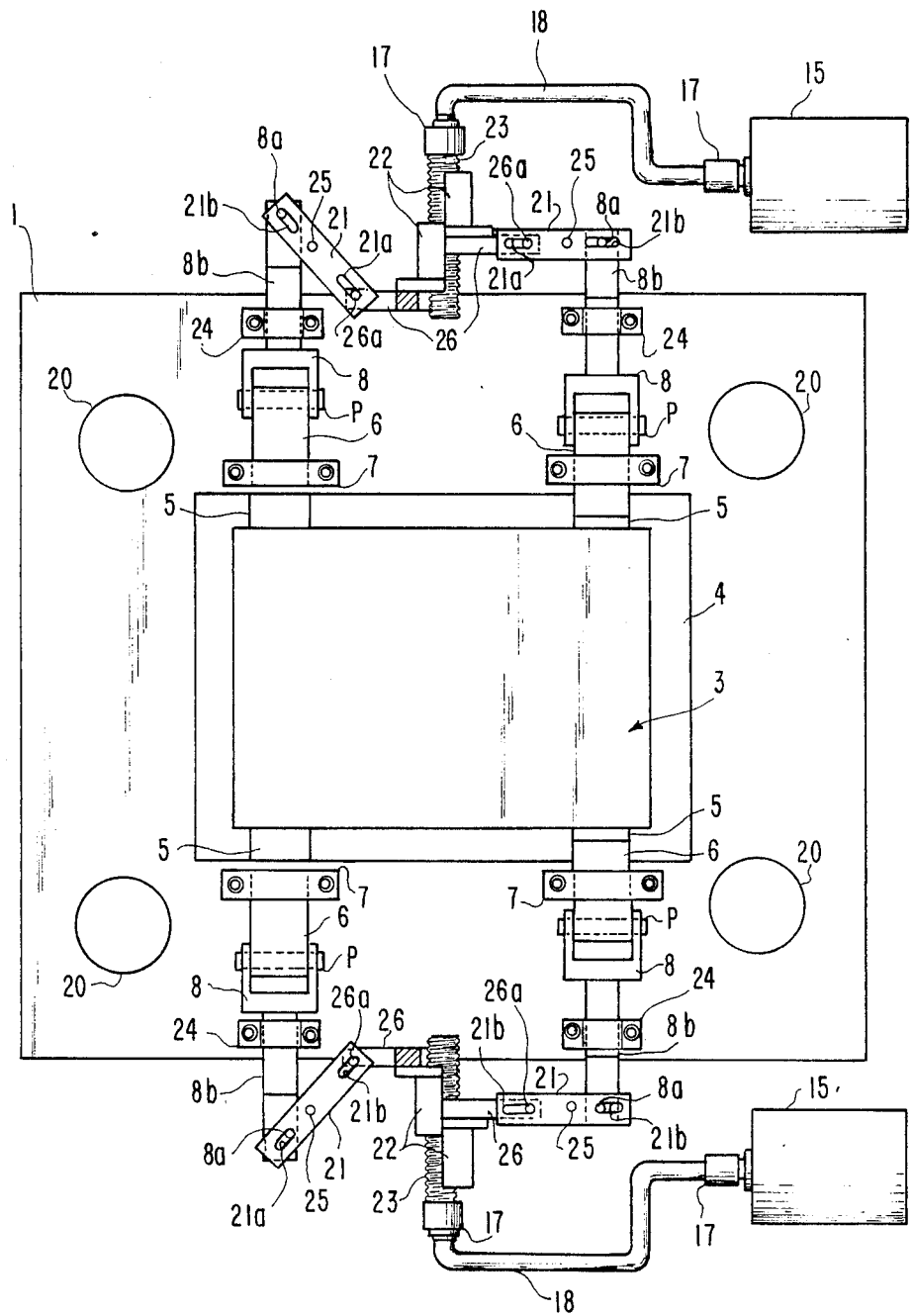
FIG. 3 is a front view of a clamp mechanism according to a second embodiment of the present invention, provided on the stationary-board side of an injection-molding machine.

FIG. 3 shows a motor-operated die clamp mechanism according to a second embodiment of the present invention, the mechanism being mounting on a stationary board 1. Also, a clamp mechanism (not shown) with the same construction is mounted on a movable board 2. The clamp mechanism of the present invention differs from that of the first embodiment in the arrangement of the transmission mechanism. In FIG. 3, like reference numerals are used to designate those elements which are common to both these embodiments, and a description of those elements is partially omitted.

In FIG. 3, a pin 8a, which is attached to a shaft 8b of each coupling member 8, is guided by means of a guide member 24 to be engaged with a slot 21b which is formed in the outer half portion of a link 21 so as to extend along the axis of the link. Further, the link 21 is swingably supported, at an intermediate portion thereof, by a shaft 25 which is supported on its corresponding board, out of the stationary and movable boards 1 and 2. A pin 26a, which is attached to its corresponding end portion of a plate member 26 fitted with a ball nut 22 for integral movement, is engaged with a slot 21a which is formed in the inner half portion of the link 21 so as to extend axially. The link 21 is designed so that the distance between the shaft 25 and the slot 21b is set to a value greater than the distance between the shaft 25 and the slot 21a. A ball screw 23, which is threadedly engaged with a ball nut 22, is rotatably supported on its corresponding board, out of the stationary and movable boards 1 and 2, by means of bearings (not shown), and is also connected to the output shaft of a motor 15 by means of a coupling 17 and a joint 18.

The operation of the clamp mechanism with the aforementioned construction will be described. Prior to the mold mounting, the ball nuts 22 are brought to positions close to dies 3, as shown in the left half portion of FIG. 3, thereby causing the movable wedges 6 to be disengaged from the fixed wedges 5. Subsequently, the dies 3 are disposed between the stationary and movable boards 1 and 2, and all the motors 15 are then driven in a predetermined rotating direction, so that the ball nuts 22, which are threadedly engaged with the ball screws 23 rotating together with the motors, are biased individually away from the dies 3. As a result, the two links 21 associated with each ball nut 22 rock in directions opposite to each other around their corresponding shafts 25. Thereupon, the movable wedges 5, which are coupled to the individual links 21 by means of the coupling members 8, advance toward the die 3, thus taking their forefront position shown in the right half portion of FIG. 3. In this position, the movable wedges 6 are engagedly pressed against the fixed wedges 5 with a great force, so that the die 3 is mounted on its corresponding board, out of the stationary and movable boards 1 and 2. Then, brake gears (not shown) are worked to maintain the die mounting state. A description of the operation for the die removal is omitted.

FIGS. 4 and 5 show a motor-operated die clamp mechanism according to a third embodiment of the present invention, which differs from those of the aforementioned two embodiments in the arrangement of the pressure means and the transmission means. This clamp mechanism comprises four clamp portions of the same construction which are arranged individually corresponding to the upper and lower edge portions of a mold base 24, adjoining the respective die mounting surfaces of a stationary board 1 and a movable board 2. The following is a description of a clamp portion situated at the top portion of the stationary board 1. In this clamp portion, a shaft 30 is disposed along a die mounting surface 1a of the stationary board 1 and above the upper edge of the mold base 4 of a die 3, and two clamp arms 31, which constitute the pressure means, are rotatably supported, by means of a shaft 30, in positions such that their inner ends face their corresponding opposite end portions of the upper edge of the mold base 4. Each clamp arm 31 is formed so that the distance between its outer end and the shaft 30 is greater than the distance between its inner end and the shaft 30. A cam shaft 32 is located parallel to the shaft 30 in the position on the side of the die mounting surface 1a, with respect to the clamp arms 31, and is rotatably supported by means (not shown) fixed to the stationary board 1. Two cams 33 are fitted on the cam shaft 32 for integral rotation therewith, the cams being situated in axial positions in alignment with the two clamp arms 31 and each having a projection 33a. Each clamp arm 31 is always urged toward its corresponding cam 33 by means of a tension spring 34 which is coupled, at either end thereof, to the arm 31 and the die mounting surface 1a. Further, the cam shaft 32 is connected, by means of a coupling 37 and a flexible joint 38, to an output shaft 35a of a speed reducing mechanism 35, whose input shaft (not shown) is coupled to the output shaft (not shown) of a motor 36. The aforementioned elements 30, 32 to 35, 37, and 38, along with the cam-side half portions of the arms 31, constitute the transmission means. The three other clamp portions (not shown) are constructed in the same manner.

The following is a description of the operation of the clamp mechanism constructed in this manner.

First, prior to the die mounting, the dies 3 are disposed between the stationary and movable boards 1 and 2 in a manner such that the cam shaft 32 is in a rotational position where each cam 33 engages its corresponding clamp arm 32 at a base circle portion 33b thereof (FIG. 5). Then, the four motors 36 are driven to rotate the cams 33 integrally with the cam shaft 32, through 90° in the counterclockwise direction of FIG. 5. Thereupon, the projections 33a of the cams 33 press the outer end portions of the clamp arms 31, thereby rocking the arms 31 counterclockwise around the shaft 30, against the urging force of the springs 34. As a result, the inner ends of the arms 31 individually press the opposite face of the mold base 4 by means of the motor's rotary force amplified by the speed reducing mechanisms 35, cams 33, and clamp arms 31. Consequently, the individual dies 3 are pressed against and fixed to the stationary and movable boards 1 and 2. Also, the motor output shafts are locked by means of brake gears (not shown). A description of the die removal is omitted.

The clamp mechanism according to the present invention is not limited to the embodiments described above. Although the small- and large-diameter screw portions 13a and 13b are provided in the first embodiment, for example, the screw portions may have the same diameter. Although the adjacent ball screws 13 are formed integrally, moreover, they may be formed independently and driven separately by means of motors for their exclusive use. The second and third embodiments may be modified in like manner. In the embodiments described above, furthermore, the dies are clamped at their upper and lower edges. Alternatively, however, they may be clamped at both side edges.

I claim:

1. A motor-operated die clamp mechanism of an injection-molding machine, said injection molding machine having a movable board, a stationary board and first and second dies detachably coupled to the movable board and stationary board respectively, said die clamp mechanism comprising:

a plurality of pressure means disposed individually on said stationary board and said movable board of the injection-molding machine so as to be movable toward and away from said first and second dies for detachably coupling said first and second dies;

a plurality of motor means corresponding to said plurality of pressure means; each motor means providing a rotary force; and a plurality of transmission means corresponding to said plurality of motor means, said transmission means amplifying the rotary force, converting the rotary force into a rectilinear driving force and transmitting said rectilinear driving force to each pressure means;

wherein each said die has a mold base formed with a plurality of fixed wedges on a peripheral edge portion thereof; each said pressure means includes movable wedges arranged for rectilinear motion so as to be movable toward and away from said fixed wedges, and each movable wedge having a slanting surface adapted to be in sliding contact with a slanting surface formed on each said fixed wedge corresponding thereto;

wherein each said transmission means includes a ball screw being integrally movable and having first and second screw portions threaded reversely to each other, said ball screw being operatively coupled to said corresponding motor means; first and second ball nuts threadedly engaged with said first and second screw portions, respectively; and link means coupling said first and second ball nuts to corresponding ones of said movable wedges, said link means being adapted to spread or contract in accordance with a rotating direction of said corresponding motor means, thereby causing said movable wedge to make a rectilinear motion.

2. A motor-operated die clamp mechanism of an injection-molding machine, said injection molding machine having a movable board, a stationary board and first and second dies detachably coupled to the movable board and stationary board respectively, said die clamp mechanism comprising:

a plurality of pressure means disposed individually on said stationary board and said movable board of the injection-molding machine so as to be movable toward and away from said first and second dies for detachably coupling said first and second dies;

a plurality of motor means corresponding to said plurality of pressure means; each motor means providing a rotary force; and a plurality of transmission means corresponding to said plurality of motor means, said transmission means amplifying the rotary force, converting the rotary force into a rectilinear driving force and transmitting said rectilinear driving force to each pressure means;

wherein each said die has a mold base formed with a plurality of fixed wedges on a peripheral edge portion thereof; each said pressure means includes movable wedges arranged for rectilinear motion so as to be movable toward and away from said fixed wedges, and each movable wedge having a slanting surface adapted to be in sliding contact with a slanting surface formed on each said fixed wedge corresponding thereto;

wherein each said transmission means includes a ball screw operatively coupled to said corresponding motor means, a ball nut threadedly engaged with said ball screw, and a link having two opposite ends and an intermediate portion, said link being swingably supported at the intermediate portion thereof and rockably coupled, at said opposite ends thereof, to said ball nut and a corresponding one of said movable wedges, respectively.

3. A motor-operated die clamp mechanism of an injection-molding machine according to claim 2, wherein said two opposite ends of said link comprise a ball-nut side end and a movable wedge side end, and wherein a distance between said intermediate portion of the link and the ball-nut side end is greater than a distance between said intermediate portion of the link and the movable-wedge side end.

4. A motor-operated die clamp mechanism of an injection-molding machine, said injection molding machine having a movable board, a stationary board and first and second dies detachably coupled to the movable board and stationary board respectively, said die clamp mechanism comprising:

a plurality of pressure means disposed individually on said stationary board and said movable board of the injection-molding machine so as to be movable toward and away from said first and second dies for detachably coupling said first and second dies;

a plurality of motor means corresponding to said plurality of pressure means, each motor means providing a rotary force;

a plurality of transmission means corresponding to said plurality of motor means, said transmission means amplifying the rotary force, converting the rotary force into a rectilinear driving force and transmitting said rectilinear driving force to each pressure means;

wherein each said die has a mold base;

each said pressure member is a clamp arm having first and second opposite ends, said clamp arm being swingably supported at an intermediate portion thereof and adapted to clamp said mold base with said first opposite end located adjacent the mold-base; and each transmission means includes a cam shaft operatively coupled to the motor means corresponding thereto, a cam having a projection and rotatable integrally with said cam shaft, and a spring for continually urging said clamp arm toward said cam, said clamp arm being adapted to clamp said mold base when said projection of said cam is rotated by said cam shaft so that said projection is in contact with said second opposite end at said clamp arm whereby said first opposite end clamps said molded base.

5. A motor-operated die clamp mechanism of an injection-molding machine according to claim 4, wherein said clamp arm has a distance between said intermediate portion of the clamp arm and the second opposite end greater than a distance between said intermediate portion of the clamp arm and the first opposite end.

6. A motor-operated die clamp mechanism of an injection-molding machine, said die clamp mechanism comprising:

a plurality of pressure means disposed individually on a stationary board and a movable board of the injection-molding machine so as to be movable toward and away from a die corresponding to each of said boards for clamping said corresponding die;

a plurality of motor means corresponding to said plurality of pressure means, each motor means providing a rotary force;

a plurality of transmission means corresponding to said plurality of motor means, said transmission means amplifying the rotary force, converting the rotary force into a rectilinear driving force and transmitting said rectilinear driving force to each pressure means, wherein each said die has a mold base formed with a plurality of fixed wedges on a peripheral edge portion thereof;

each said pressure means includes movable wedges arranged for rectilinear motion so as to be movable toward and away from said fixed wedges, and each movable wedge having a slanting surface adapted to be in sliding contact with a slanting surface formed on each said fixed wedge corresponding thereto;

each said pressure means being a clamp arm having first and second opposite ends, said clamp arm being swingably supported at an intermediate portion thereof and adapted to clamp said mold base with said first opposite end nearest the mold base; and each said transmission means includes a cam shaft operatively coupled to the motor means corresponding thereto, a cam having a projection and rotatable integrally with said cam shaft, and a spring for continually urging said clamp arm toward said cam, said clamp arm being adapted to clamp said mold base when said projection of said cam is rotated by said cam shaft so that said projection is in contact with said second opposite end of said clamp arm whereby said first opposite end clamps said mold base.

7. A motor-operated die clamp mechanism of an injection-molding machine according to claim 6, wherein said clamp arm has a distance between said intermediate portion of the clamp arm and the second opposite end greater than a distance between said intermediate portion and the first opposite end.

* * * * *